Oct. 23, 1962 R. G. ROWE 3,059,468
VIBRATION APPARATUS FOR TESTING ARTICLES
Filed April 26, 1960

*Robert G. Rowe*
INVENTOR.

United States Patent Office 3,059,468
Patented Oct. 23, 1962

3,059,468
VIBRATION APPARATUS FOR TESTING ARTICLES
Robert G. Rowe, 8237 Witkop Ave., Niagara Falls, N.Y.
Filed Apr. 26, 1960, Ser. No. 24,705
5 Claims. (Cl. 73—67.2)

This invention relates to improved apparatus for testing and comparing the mechanical properties and physical characteristics of articles or bodies, as determined from their natural frequencies of vibration.

Factors influencing the natural frequency of vibration clearly are seen from examining the equation for the natural frequency of vibration of a disc-shaped article, such as an abrasive wheel for example, which is:

$$f = \frac{kh}{d^2} \times \sqrt{\frac{E}{\rho(1-\sigma^2)}}$$

where:

$f$=frequency, cycles per second
$k$=constant
$h$=thickness of disc
$d$=diameter of disc
$E$=modulus of elasticity
$\rho$=density
$\sigma$=Poisson's ratio It may be generalized that the frequency is controlled by Dimensional factors and Physical Constant factors, the latter being those under the radical sign in the above equation. Thus, the natural frequency of vibration of each of a number of articles of identical size and shape will be a measure of the physical and mechanical properties of the articles or bodies. No further description of the interrelation of these factors, nor of the equations for articles of different shape, need be given here as they appear in detail in the prior art in volume II, section 51 of the Non-Destructive Testing Handbook, published by the Ronald Press Company, New York, N.Y. (1959).

Devices for measuring the natural frequency of vibration of articles are old in the art. For example, U.S. Patent Number 2,486,984, "Vibration Apparatus for Testing Articles," issued to the present inventor November 1, 1949, describes methods and apparatus for comparing the physical properties of bodies by measuring their natural frequencies of vibration. The apparatus of the reference patent has found wide commercial acceptance, particularly in testing bonded abrasive wheels or bonded graphite articles.

However, normal manufacturing tolerances in producing certain such articles may permit varying degrees of dimensional differences, in addition to the variations in the physical properties which it is desired to evaluate and compare. In cases in which the dimensional differences exceed certain limits, it may be necessary to measure these differences and mathematically calculate their effect on frequency in order accurately to compare the differences in physical properties for product evaluation and quality control.

Therefore, an object of the present invention is to provide apparatus for evaluating the relative physical and mechanical properties of articles, from their natural frequencies of vibration, independently of variations in one or more of their dimensions.

Another object of this invention is to provide apparatus automatically to correct the indicated frequency of vibration of articles for one or more of the dimensions of the articles.

A further object is to provide apparatus for producing, from the natural frequency of vibration of articles, a numerical comparison of the physical and mechanical properties which substantially is independent of variations in dimensions.

Still another object is to provide apparatus which indicates the frequency of vibration that the artcile would exhibit if one or more of its dimensions was equal to a predetermined or preselected dimension.

These objects, and other objects ancillary thereto, I prefer to accomplish in short by exciting the article at its natural frequency of vibration and measuring the number of vibrations occurring during a time interval whose duration is controlled by one or more of the dimensions of the article.

The novel features which I believe to be characteristic of my invention are engendered with particularity in the appended claims; the invention itself, however, will be best understood by reference to the accompanying illustrative drawings and description, in which:

Figure 1:
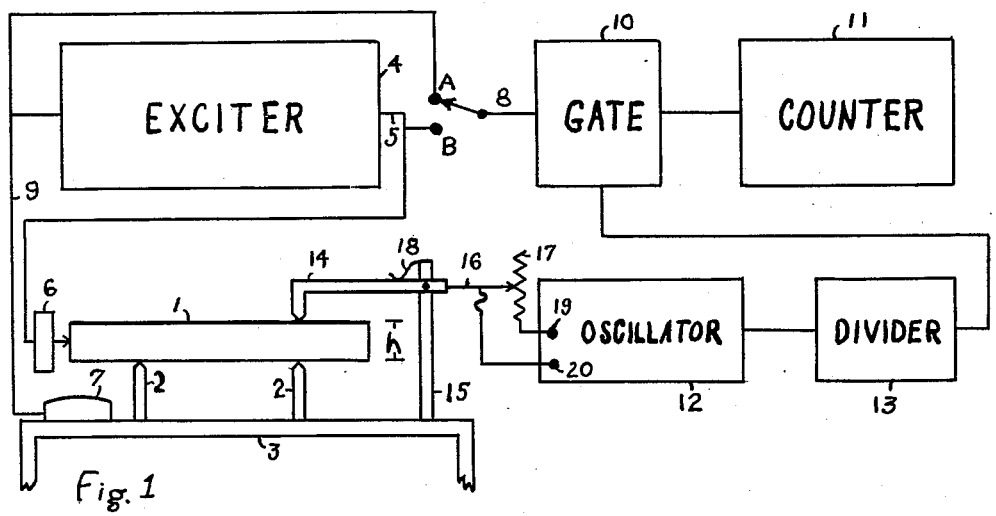
FIGURE 1 illustrates a view in elevation of the apparatus of the present invention, some of the apparatus being shown schematically.

With reference to FIGURE 1, I have set forth what I believe to be a novel and useful combination of known elements to accomplish those objectives hereinbefore recited. In FIGURE 1, the article 1 being tested is shown resting on supports 2 which may be attached to table 3. The prior art of the reference patent teaches that such supports are best located at nodes of vibration. Suitable means to excite natural frequency vibrations in article 1 is represented by exciter 4, transducer 6 and microphone 7. Exciter 4 may be a calibrated variable frequency generator covering the normal frequency range of the articles, such as the Model 200AB Audio Oscillator manufactured by the Hewlett-Packard Company, Palo Alto, California, for example. Exciter 4 is electrically connected by lead wire 5 to transducer, or electromechanical vibrating means, 6, which conveniently may be a Model M41–500 Recording Head as manufactured by the Astatic Corporation, Conneaut, Ohio. Transducer 6 has its vibrating needle stylus touching article 1 in order to impart electrically generated mechanical vibrations to article 1. The variable frequency generator may be tuned to a frequency matching a natural frequency of vibration of article 1 to excite and sustain natural frequency vibrations in article 1 through transducer 6.

An alternative means, which has the advantage readily of indicating when the frequency of the variable frequency generator matches a natural frequency of vibration of article 1, completely is described in the reference patent cited above. Those versed in the art will recognize audio oscillator 1, vibrating means 18 and microphone 23 of the reference patent as being equivalent respectively to the variable frequency generator or exciter 4, the transducer 6 and the microphone 7 of the present invention. Microphone 7 is positioned close to article 1 to detect the natural frequency of vibration of article 1 and convert it into an alternating current of equivalent frequency.

Another alternative means or method to excite natural frequency vibrations in article 1 would be to support article 1 for a preferred mode of vibration and tap article 1 with a manual or mechanized striker to cause it to ring at its natural frequency. It is not meant to limit the method or means of exciting natural frequency vibrations in the articles.

With article 1, of FIGURE 1, excited at a natural frequency of vibration by one aforementioned means, an alternating electric signal with a frequency equal to the natural frequency of vibration of the article will appear at both terminal A and terminal B of single pole double throw switch 8. There is a distinction between these two signals. The signal delivered to terminal A through electrical lead 9 from microphone 7 is that generated by microphone 7 as a result of natural frequency vibrations of article 1. The signal delivered to terminal B from exciter 4 through electrical lead 5 is that generated by the oscillator of exciter 4. The first is generated by the vibrations of the body. The second is generated by the apparatus which is forcing the body to vibrate. In this invention it is not meant to limit the origin of the signal to either of these two sources, except that it must originate from one or the other of these two sources.

In FIGURE 1 the common terminal of switch 8 is electrically connected through normally-closed electronic gate 10 to electronic decade counter units 11. Further, oscillator 12 is electrically connected to frequency divider 13, and the latter electrically connected to gate 10. This combination, and the interrelated electrical function, of gate 10, counter decades 11, oscillator 12 and divider 13 are well known in the electronic art. They are combined substantially as shown in a number of commercially available instruments called "frequency counters" or "events-per-unit-time meters," as exemplified by the Model 521C Industrial Counter manufactured by the aforementioned Hewlett-Packard Company, with one important exception. These prior art devices employ a crystal-controlled oscillator for extreme stability and accuracy; whereas, I prefer to employ a variable frequency oscillator for reasons which will become apparent as the description proceeds.

To clarify the description, the modus operandi of typical commercially available frequency counters will be described in some detail. Because of the similarity, the elements of FIGURE 1 may be used to explain the normal functioning of commercial counters, keeping in mind that the described embodiment of the present invention employs a variable frequency oscillator.

In a typical frequency counter, oscillator 12 may be a conventional crystal-controlled electron tube oscillator operating at 100,000 cycles per second (c.p.s.), for example, and electrically connected to divider 13. Divider 13 may be a number of cascaded electron tube multivibrator stages adjusted to produce a total frequency division of 100,000 to 1. The 100,000 c.p.s. oscillator signal, electrically connected to divider 13, will appear at the divider output as 1 c.p.s.

For normally-closed electronic gate 10, either a biased diode or a biased multigrid electron tube is common in the art. A high bias on a grid of the electron tube, for example, prevents the passage of signals through the gate to the counter decades 11 or, in electronic parlance, "holds the gate closed." The gate circuit in commercial instruments contains included circuit means, often called a "latching binary," the purpose of which is to hold the gate closed after elapse of the timed counting interval. The gate circuit need not be further described in detail, because of the variety of exact circuit modifications found in conventional frequency counters.

In commercial instruments a control voltage of proper amplitude and duration is connected to the gate to initiate and terminate counting, such as that provided from the voltage at the output of divider 13 shown electrically connected to gate 10, thus opening gate 10 and permitting the passage of signals to be counted to counter decades 11. Here they are counted for the time duration of one cycle of the control signal voltage, or precisely 1 second. Counter 11, in practice, comprises a series of cascaded decade counting units, such as Models AC–4C, AC–4G or AC–4E manufactured by the Hewlett-Packard Company, in order to increase the capacity of the total counts to any number of significant digits desired. These commercial units are capable, not only of counting, but of indicating the total count, typically through a series of illuminated neon glow lamps situated behind translucent numerals.

Commercial frequency counters are arranged, and function substantially as described, to count the frequency alternations of a signal appearing at their input, such as at switch 8, for a time interval of precisely 1 second and to indicate the frequency numerically in cycles per second. The time duration of counting accurately is controlled, as by a crystal oscillator and a divider chain, in order to provide a high degree of precision in counting and indicating frequency in cycles per second.

I have found that by employing a variable frequency oscillator for oscillator 12, and by controlling the frequency of oscillator 12 from one or more of the dimensions of the article under test, I am enabled to accomplish the hereinbefore recited objectives of the present invention in a novel and useful fashion.

In the embodiment of this invention illustrated in FIGURE 1, thickness sensor arm 14, supported from table 3 by pivotal support 15, is mechanically coupled to contact slider 16 of variable resistor 17. Arm 14, further, is urged to make mechanical contact with article 1 by leaf spring 18. Contact slider 16 and variable resistor 17 are shown connected by electrical leads to terminals 19 and 20 of oscillator 12. Arm 14, support 15, slider 16 and variable resistor 17 cooperate to effect a resistance across terminals 19 and 20 of oscillator 12 which is a function of the angular disposition of sensor arm 14 about pivotal support 15.

As the uppermost extremities of article supports 2 cooperate to define a reference plane, the thickness "h" of article 1 resting on supports 2 will control the angular disposition of sensor arm 14 and, hence, the resistance subtended across terminals 19 and 20 of oscillator 12. Other means are common in the art for providing a resistance which is a function of the linear motion of a sensor arm, for example, the linear motion potentiometer manufactured by the Computer Instrument Corporation, Hempstead, New York. Such variable resistance devices may be supported vertically above article 1, with the linear slider arm of the control urged to contact article 1 by a spring mechanism. Vertical disposition of the slider, hence the resistance of the control, will be determined by the thickness of the article.

A resistance, varying with article thickness, may be employed to control the frequency of oscillator 12. Resistance-capacitance, or RC, oscillators are well known in the art. For example, J. C. Hewitt describes a transitron RC oscillator in "R-C Oscillator Performance," Electronics, March 1944, page 126. For illustrative purposes, the basic oscillator of Hewitt's FIGURE 2 may be substituted for oscillator 12 of the present invention. Replacing Hewitt's frequency-determining resistor $R_1$ with variable resistor 17 of the present invention will provide an oscillator with a frequency which is a function of resistance, hence, of thickness "h" of article 1.

In RC oscillators the oscillation frequency "f" is determined by the circuit constants and by the exact oscillator circuit employed. In one particular RC oscillator circuit, the frequency "f" is determined by the magnitude of the resistance "R" and the capacitance "C" in accord with the following general expression:

$$f = \frac{1}{2\pi RC}$$

The terms "$2\pi$" and "C" may be collected in a constant "K" and the expression revised, to become:

$$f = \frac{K}{R}$$

Thus, the frequency of oscillation is inversely proportional to resistance "R."

With each of the elements of an embodiment of the present invention, as well as their interconnection, described in detail, the functioning of the overall apparatus perhaps is best described by a typical example.

Assume three articles of manufacture, such as discs X, Y and Z, for example, with identical physical constants and idenitcal dimensions, except that their thickness dimensions "h" are 1.0, 1.1 and 0.9 inches, respectively. Further assume that the particular physical constants and diameter of the articles, selected for this example, cooperate to establish a natural frequency of vibration of 1000 cycles per second for disc X which is 1.0 inch thick. Using the method and apparatus of the reference patent, natural frequencies of 1000, 1100 and 900 cycles per second, respectively, for discs X, Y and Z would be indicated. Even though the physical constants of the discs are identical, the natural frequencies of vibration vary directly as thickness as shown in the frequency equation disclosed hereinbefore. By techniques known in the art, such as the measurement and calculation method described on page 51–11 of the reference to the Non-Destructive Testing Handbook, the frequencies may be corrected for the differences in thickness dimensions and the corrected frequencies all will equal 1000 cycles per second. Such measurement and calculation is time-consuming and accrues greater expense for the testing or quality control operation than would be the case were it unnecessary.

With reference to FIGURE 1 of the present invention, article X, 1.0 inch thick is placed on supports 2. Article X is excited at its natural frequency of vibration of 1000 cycles per second by a means and method described hereinbefore. Switch 3, in position A, for example, passes the 1000 c.p.s. alternating current "article" signal to normally-closed gate 10.

In turn, thickness sensor arm 14, contact slider 16 and variable resistor 17 cooperate to subtend a resistance across terminals 19 and 20 of oscillator 12, such that oscillator 12 oscillates at a frequency of 100,000 cycles per second. Divider 13 divides the 100,000 c.p.s. oscillator frequency to 1.0 c.p.s. Under control of this 1.0 c.p.s. divider output, gate 10 opens for precisely 1 second and passes the 1000 c.p.s. article signal to counter 11 for precisely 1.0 second. Counter 11 counts for 1.0 second and indicates a counter reading of 1000 counts.

Subsequently, article Y, 1.1 inches thick, is placed on supports 2 and excited at its natural frequency of vibration of 1100 cycles per second. In the manner described above, the article signal of 1100 cycles per second is conveyed to normally-closed gate 10. Article Y, being thicker than article X, will cause sensor arm 14, contact slider 16 and variable resistance 17 to cooperate to decrease the resistance subtended across terminals 19 and 20 of oscillator 12. As the frequency of oscillator 12 has been shown to be inversely proportional to resistance, the frequency of oscillator 12 may be caused to increase to 110,000 cycles per second. Divider 13 divides the 110,000 c.p.s. oscillator frequency to 1.1 c.p.s. Under control of the 1.1 c.p.s. divider output, gate 10 opens for 0.90909 second and passes the 1100 c.p.s. article signal to counter 11 for 0.90909 second, as the gate opening interval is the reciprocal of frequency. Counter 11 counts the article signal of 1100 c.p.s. for the shorter time of 0.90909 second and indicates a counter reading of 1000 counts.

Article Z, with a thickness of 0.9 inch and a natural frequency of 900 c.p.s., is thinner than article X. In a like manner, it may be shown that this will eventuate in gate 10 opening for 1.11111 seconds. Counter 11 counts the 900 c.p.s. article signal for the longer time of 1.11111 seconds and indicates a counter reading of 1000 counts.

Typical illustrative data is tabulated below:

| Article Thickness, Inches | Natural Frequency, C. p. s. | Oscillator 12, c. p. s. | Divider 13, c. p. s. | Gate Time, seconds | Counter Reading |
|---|---|---|---|---|---|
| 1.0 | 1,000 | 100,000 | 1.0 | 1.00000 | 1,000 |
| 1.1 | 1,100 | 110,000 | 1.1 | 0.90909 | 1,000 |
| 0.9 | 900 | 90,000 | 0.9 | 1.11111 | 1,000 |

Thus, the improved apparatus produces the same reading for articles with identical physical constants, but varying in the thickness dimension. In this case, the numerical count is equal to the natural frequencies the articles would exhibit provided they actually were all 1.0 inch thick.

Figure 2:
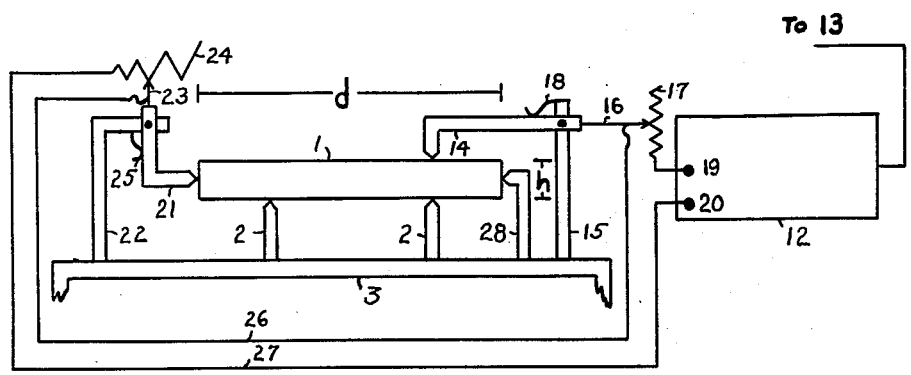
FIGURE 2 illustrates a view in elevation of a part of the apparatus of the present invention.

In a like manner the influence of varying diameter of disc-shaped articles may be compensated. In FIGURE 2, article 2 with thickness "h" and diameter "d" is shown resting on supports 2. Diameter sensor arm 21, supported from table 3 by pivotal support 22, is mechanically coupled to contact slider 23 of variable resistor 24. Arm 21, further, is urged to make mechanical contact with article 1 by leaf spring 25. Stop 28 is supported from table 3 to provide a fixed reference point, and is positioned to cooperate with arm 21 and supports 2 such that arm 21 and stop 28 contact article 1 at the extremities of a diameter.

Diameter sensor arm 21, support 22, slider 23 and variable resistor 24 cooperate to effect a resistance across electrical leads 26 and 27 and, hence, across terminals 19 and 20 of oscillator 12 which is a function of the angular disposition of arm 21 about pivotal support 22. As stop 28 provides a reference point for one extremity of a diameter of article 1, the diameter "d" of article 1 will control the angular disposition of diameter sensor arm 21, the resistance of variable resistor 24, the resistance subtended across terminals 19 and 20 of oscillator 12 and, hence, the frequency of ocillator 12.

Special variable control resistors are well known in the present electronic control art, as manufactured by a number of producers, and it will be noted that variable resistors 17 and 24 are illustrated differently in FIGURE 2. In presently available control resistors, for example, the resistance vs. rotation characteristic, or the rotation vs. resistance characteristic, may be sine law, cosine law, square law, linear or otherwise non-linear. It is to be pointed out that, in this embodiment of the present invention, the control characteristics of resistors 17 and 24 carefully are selected to cooperate both with the characteristics of oscillator 12 and the equation for the natural frequency of vibration of the article, in order to produce from the dimensional differences the proper corrective action.

While I have shown and described methods and apparatus for governing the frequency of gate timing oscillator 12, by employing a resistance which is controlled by a dimension, it will be obvious to those versed in the art that a capacitance which is controlled by a dimension may be employed, where the capacitance is the frequency determining capacitor of a typical RC oscillator. It will be apparent to those skilled in the art that it may prove advantageous to employ a variable resistor, the resistance of which is controlled by one dimension, in combination with a variable capacitor, the capacitance of which is controlled by another dimension, as the active elements of the gate timing oscillator circuit.

It is not meant to limit the invention to the use of RC oscillators, under control of one or more of the dimensions of an article under test, for the gate timing oscillator. For example, inductance=capacitance LC oscillators may prove advantageous, particularly in applications where the characteristic of the oscillator frequency vs. inductance and/or capacitance properly mates with the corrective factors mandated by the frequency equation for the natural frequency of vibration for the particular shape of the articles to be tested.

It is recognized that the subject oscillators may have inadequate long-term frequency stability for particularly critical applications, due to ageing of the components. Among a number of well-known techniques available for oscillator stabilization, one consists in periodic oscillator standardization by periodic comparison with a stable reference frequency. For example, a dummy article of exact nominal dimensions periodically may be substituted for the article under test and the frequency of the time interval oscillator corrected to the standard reference frequency through a servo-system.

In connection with the location of the dimension sensors of the present invention, they may contact the article at vibration nodes, or points of minimum vibration, in order not to damp the natural frequency of vibration of the articles under test.

While I have shown and described in detail one preferred embodiment of my invention, I am aware that various changes and modifications may occur to those versed in the art without departing from the invention. Therefore, it is aimed in the appended claims to cover any and all changes and modifications which fall within the true spirit and scope of the invention.

I claim:

1. An apparatus for testing articles, comprising means to excite an article at a natural frequency of vibration thereof, means to derive an electric signal representative of the frequency of vibration of said article, a normally-closed electronic gate, an electronic counter connected to said signal-deriving means through said gate, gate timer means, dimension sensor means responsive to one or more dimensions of said article connected to said gate timer, said latter means connected to and controlling said gate and said dimension sensor and gate timer means cooperating to open said gate for a time interval controlled by one or more dimensions of said article.

2. An apparatus for testing disc-shaped articles, independently of variations in the thickness of the articles, comprising means to excite an article at a natural frequency of vibration thereof, means to derive an electric signal representative of the frequency of vibration of said article, a normally-closed electronic gate, an electronic counter connected to said signal-deriving means through said gate, gate timer means, dimension sensor means responsive to the thickness of said article connected to said gate timer, said latter means connected to and controlling said gate and said dimension sensor and gate timer means cooperating to open said gate for a time interval inversely related to the thickness of said article.

3. An apparatus for testing disc-shaped articles, independently of variations in the diameter and thickness of the articles, comprising means to excite an article at a natural frequency of vibration thereof, means to derive an electric signal representative of the frequency of vibration of said article, a normally-closed electronic gate, an electronic counter connected to said signal-deriving means through said gate, gate timer means, dimension sensor means responsive to the diameter of said article and dimension sensor means responsive to the thickness of said article connected to said gate timer, said latter means connected to and controlling said gate and said dimension sensor and gate timer means cooperating to open said gate for a time interval which varies as the diameter of said article and inversely as the thickness of said article.

4. In an apparatus for evaluating the relative physical properties of articles, means to support an article for a preferred mode of vibration, vibration exciting means coupled to said article to vibrate said article at a natural frequency of vibration thereof, a normally-closed electronic gate, an electronic counter connected to said exciter through said gate, gate timer means, dimension sensor means responsive to one or more dimensions of aid article connected to said gate timer, said latter means connected to and controlling said gate and said dimension sensor and gate timer means cooperating to open said gate for a time interval controlled by one or more dimensions of said article.

5. In an apparatus for evaluating the relative physical properties of articles, means to support an article for a preferred mode of vibration, vibration exciting means coupled to said article to vibrate said article at a natural frequency of vibration thereof, vibration detecting means coupled to said article to provide an electric signal representative of the frequency of vibration of article, a normally-closed electronic gate, an electronic counter connected to said detecting means through said gate, gate timer means, dimension sensor means responsive to one or more dimensions of said article connected to said gate timer, said latter means connected to and controlling said gate and said dimension sensor and gate timer means cooperating to open said gate for a time interval controlled by one or more dimensions of said article.

References Cited in the file of this patent

UNITED STATES PATENTS 2,486,984    Rowe  ---------------- Nov. 1, 1949